United States Patent [19]

Mulla et al.

[11] Patent Number: 5,652,859

[45] Date of Patent: Jul. 29, 1997

[54] METHOD AND APPARATUS FOR HANDLING SNOOPS IN MULTIPROCESSOR CACHES HAVING INTERNAL BUFFER QUEUES

[75] Inventors: Dean Mulla; Sorin Iacobovici, both of San Jose, Calif.

[73] Assignee: Institute for the Development of Emerging Architectures, L.L.C., Cupertino, Calif.

[21] Appl. No.: 516,421

[22] Filed: Aug. 17, 1995

[51] Int. Cl.$^6$ ................................................ G06F 12/00
[52] U.S. Cl. ................................. 395/473; 395/471
[58] Field of Search ............................. 395/468, 473, 395/471, 472, 449, 859

[56] References Cited

U.S. PATENT DOCUMENTS

| | | | |
|---|---|---|---|
| 5,193,170 | 3/1993 | Lam | 395/473 |
| 5,228,135 | 7/1993 | Ikumi | 395/458 |
| 5,263,142 | 11/1993 | Watkins | 395/842 |
| 5,287,481 | 2/1994 | Lin | 395/462 |
| 5,293,603 | 3/1994 | MacWilliams | 395/309 |
| 5,319,768 | 6/1994 | Rastegar | 395/458 |
| 5,325,503 | 6/1994 | Stevens | 395/473 |
| 5,325,511 | 6/1994 | Collins | 395/455 |
| 5,335,335 | 8/1994 | Jackson | 395/448 |
| 5,341,487 | 8/1994 | Derwin | 395/448 |
| 5,353,415 | 10/1994 | Wolford | 395/306 |
| 5,355,467 | 10/1994 | MacWilliams et al. | 395/473 |
| 5,359,723 | 10/1994 | Mathews et al. | 395/449 |
| 5,369,753 | 11/1994 | Tipley | 395/449 |
| 5,386,523 | 1/1995 | Crook | 395/421.1 |
| 5,404,467 | 4/1995 | Saba et al. | 395/375 |
| 5,404,483 | 4/1995 | Stamm et al. | 395/471 |
| 5,404,489 | 4/1995 | Woods | 395/479 |
| 5,528,134 | 6/1996 | MacWilliams et al. | 395/465 |
| 5,528,764 | 6/1996 | Heil | 395/293 |
| 5,590,310 | 12/1996 | Willenz et al. | 395/473 |

OTHER PUBLICATIONS

Hennessy, John L. and David A. Patterson. Computer Architecture: A Quantitative Approach, pp. 467–468, 1990.

*Primary Examiner*—Tod R. Swann
*Assistant Examiner*—Conley B. King, Jr.
*Attorney, Agent, or Firm*—Jack A. Lenell

[57] ABSTRACT

A method and apparatus for snooping both cache memory and associated buffer queues in a cache subsystem arrangement. Since there are usually several requests for cache data being handled at any given time under high performance operation of multiple processors, a cache arrangement includes at least one buffer queue for storing the address of the cache data line and the status of the cache data line, which facilitate keeping track of the data requests and handling them efficiently. In response to a snoop request, a snoop address is compared to the address stored in the buffer queue so as to provide a positive comparison result if the snoop address matches the address stored in the buffer queue, thereby indicating a snoop hit condition. The buffer queue of the cache arrangement further has a snoop hit bit for storing a record of the positive comparison result that indicates the snoop hit condition. Even if there is still a pending transaction involving the buffer queue, the snoop request of the cache is satisfied once the comparison result has been stored in the snoop hit bit of the buffer queue, thereby keeping the cache high performance for local code while at the same time providing efficient support for snoop requests.

8 Claims, 1 Drawing Sheet

METHOD AND APPARATUS FOR HANDLING SNOOPS IN MULTIPROCESSOR CACHES HAVING INTERNAL BUFFER QUEUES

FIELD OF THE INVENTION

The present invention relates to computer systems, and more particularly to a computer system implementation for providing efficient management of memory shared by processors in a multiprocessor (MP) system.

BACKGROUND OF THE INVENTION

In multiprocessor systems, multiple central processing units share data in memory. It is desirable that the MP system maintain "coherency" among all data in the shared memory. Data could exist in several different locations including a high speed cache memory, as well as a main memory. Coherency refers to the concept in which each central processing unit (CPU) must have access to the most recently modified data corresponding to a particular address in the shared memory. In other words, if a particular data at a certain address is most recently modified in one of the memory locations, then the most recently modified data must be identified and available to all CPU's requesting the particular data.

An example of a way to maintain coherency in the system is to monitor reads and writes to the main memory. When either a memory read or a memory write of data at an address is detected, this address is used as a snoop address. A snoop request is initiated, directed to all of the cache memories in the multiprocessor system to search for any address in the cache memories that matches the snoop address. A snoop hit occurs for every match, and any needed corrective action is taken to maintain coherency of the data at the address in the cache where the snoop hit occurs.

In normal operation of a high performance multiprocessor system having cache memory, there are usually several requests for cache data pending at any given time. In order to keep track of these requests and handle them efficiently, buffer queues coupled with the cache memory in a cache subsystem are needed. However, it is difficult both to maintain the cache subsystem at a high level of performance for local code, and at the same time to provide efficient support for snoop requests. What is needed is a method and apparatus for providing efficient snooping of both cache memory and any associated buffer queues.

SUMMARY OF THE INVENTION

The present invention provides an efficient method and apparatus for snooping both cache memory and associated buffer queues in a novel cache subsystem arrangement.

Briefly, and in general terms, the present invention includes a first and second central processing unit, a main memory, and a system bus coupled with the first and second central processing unit and the main memory. Coupled with the second central processing unit is a novel cache arrangement that includes a cache memory for storing a data line, and a cache tag for identifying an address of the cache data line and a status of the cache data line. Since there are usually several requests for cache data being pending at any given time under high performance operation of the processors, the cache arrangement further includes at least one buffer queue for storing the address of the cache data line and the status of the cache data line, which facilitates keeping track of the several pending cache requests and handling them efficiently.

A bus controller is coupled with the system bus for initiating a snoop request and providing a snoop address in response to the first central processing unit accessing the main memory over the system bus, for example a read or write to main memory. In response to the snoop request the cache tag is searched. If the snoop address matches an address of the cache data line, then a snoop hit condition occurs and appropriate action is taken based upon the line status, so as to maintain data coherency.

In response to the snoop request, the snoop address is also compared to the address stored in the buffer queue so as to provide a positive comparison result if the snoop address matches the address stored in the buffer queue, thereby indicating the snoop hit condition. The buffer queue of the novel cache arrangement further has a snoop hit bit for storing a record of the positive comparison result that indicates the snoop hit condition. Similarly, in the preferred embodiment additional address entries of additional buffer queues are snooped, and for each matching address entry a respective snoop hit bit is set. In accordance with the teachings of the invention, even if there is still a pending transaction involving the buffer queue, the snoop request of the second cache is satisfied once the comparison result is stored in the snoop hit bit of the buffer queue, thereby keeping the novel cache arrangement of the present invention high performance for local code while at the same time providing efficient support for snoop requests.

Other aspects and advantages of the present invention will become apparent from the following detailed description, taken in conjunction with the accompanying drawing, illustrating by way of example the principles of the invention.

DETAILED DESCRIPTION OF PREFERRED EMBODIMENT

Figure 1:
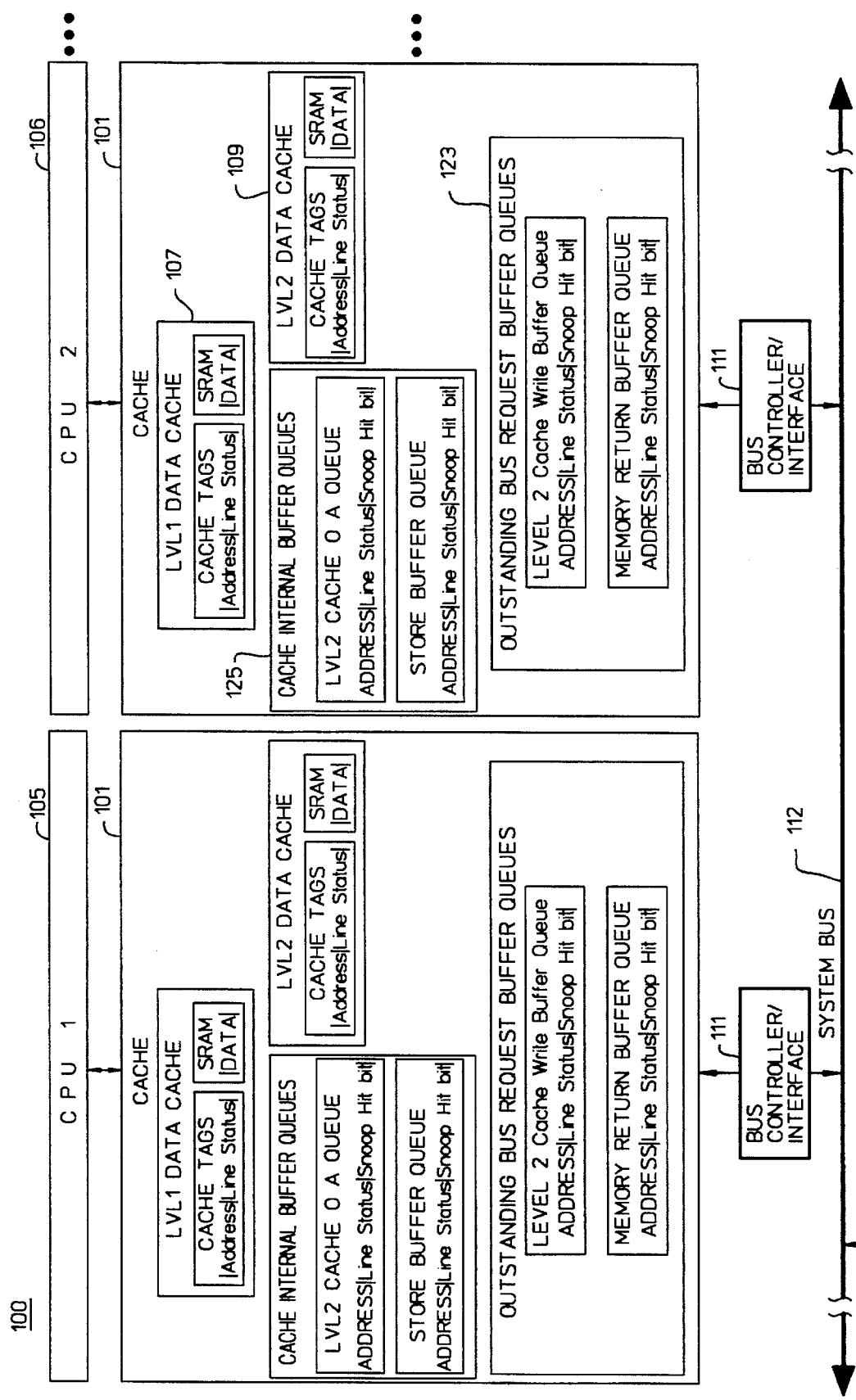
FIG. 1 shows a partial block diagram of a multiprocessing system employing preferred caches of the invention.

FIG. 1 shows a partial block diagram of a multiprocessing (MP) system 100 employing a plurality of preferred cache subsystem arrangements 101 of the invention. Each cache arrangement provides high-speed memory coupled between main memory 103 and a respective first and second central processing unit (CPU) 105, 106. The central processing unit (CPU) is a part of a data processing unit that fetches and executes instructions. The cache arrangements 101 are continually updated to contain recently accessed contents of main memory, so as to reduce access time. When a program makes a memory request, the CPU first checks to see if data is in the cache arrangement, so that it can be retrieved without accessing main memory.

The central processing units (CPU's) 105, 106 share data lines in memory space. In this document, data lines generally refer to any information stored in memory, including instructions, processed data, or unprocessed data. In the preferred embodiment of the invention shown in FIG. 1, each of the cache arrangements 101 include a respective first and second level data cache 107, 109 and application of the invention to the data caches is discussed in detail subsequently herein. However, it should be understood that in alternative embodiments the invention is suitably applied to instruction caches, or to combined instruction and data caches with beneficial results.

The MP system advantageously maintains "coherency" among all data lines in memory. The data lines exist in several different locations: as cache data lines located in the cache arrangements 101 each proximately coupled to a respective one of the CPU's 105, 106, and as main memory data lines located in the main memory 103 remotely coupled to the CPU's 105, 106. Coherency refers to the concept in which each central processing unit (CPU) must have access to the most recently modified data corresponding to a particular address in the shared memory. In other words, if a particular data line at a certain address is most recently modified in one of the memory locations, the most recently modified data line must be identified and available to all of the CPU's requesting the particular data line. In order to maintain coherency in the MP system, a respective bus controller/interface 111 coupled with each the cache arrangements 101 monitors a system bus 112 for accesses to main memory 103, for example, reads or writes to main memory. For example, when the bus controllers detect the first CPU 105 accessing main memory, either a memory read or a memory write, each bus controller initiates a snoop cycle directed to a respective proximately coupled cache arrangement, including the cache arrangement proximately coupled with the second processor 106.

The protocol implemented for the snoop cycle depends in large part, on the types of data caches selected in the MP system. Conventionally, data caches are classified as either a "write-through" (WT) type or a "write-back" (WB) type. In some embodiments, caches are designed so that they can operate as either the WT or the WB type cache, depending upon a logical state or status of an input to the data cache.

In the WT type data cache, data lines are "written through" to the main memory upon each modification of the cache data lines, such as updates or changes by any of the central processing units. Accordingly, the most recently modified data lines are always in the main memory. As a result, a protocol for maintaining coherency of the WT type data cache initiates a snoop cycle only on memory writes. No action needs to be taken by the bus controller on memory reads from the WT data cache arrangement.

WB and WT type caches each have different advantages and disadvantages. In the WB type data cache, data lines are not immediately "written through" to main memory upon each modification of the cache data lines. Consequently, in the preferred embodiment of the invention, WB type data caches are employed so that a local one of CPUs advantageously modifies data lines in a local WB type data cache many times, without always having to inform other memory locations in the MP system of the changes. Helpful supportive teachings directed to the write back type caches and the write through type caches is found in U.S. Pat. No. 5,404, 489 issued on Apr. 4, 1995 to Woods et al. and assigned to Hewlett-Packard Company, which is incorporated herein by reference. It should be understood that although the preferred embodiment of FIG. 1 shows cache arrangements 101 including WB type data caches that are specially adapted in accordance with the teachings of the invention, in alternative embodiments WT type data caches are employed and suitably adapted in accordance with the teachings of the invention with beneficial results.

In the WB type data cache, the data lines are written from the WB data cache when the data lines are requested by some other source, or when there is a need to flush the data lines out to main memory in response to program control or to make room for a new data line. If during the snoop cycle it is determined that a particular data cache of the WB type has modified data, then the particular data cache provides the modified data to the requesting CPU. If during the snoop cycle a memory write occurs from the WB type data cache, a protocol for maintaining coherency is to invalidate the data line at all memory locations other than the receiving memory location.

During high performance system operation, there are several cache requests being handled at one time. In order to keep track of these requests and handle them efficiently, in the preferred embodiment there are several buffer queues in the cache subsystem arrangement. To efficiently maintain multiprocessor cache coherence it is important to snoop these buffer queues in an efficient manner. As discussed in further detail subsequently herein, the adaptation of the buffer queues by adding a snoop hit bit to record snoop hits in the buffer queues in accordance with the principles of the invention contributes to advantageously maintaining the cache arrangement at a high level of performance for local code and at the same time provides efficient support for snoop requests.

Prior to the present invention, investigations by the inventors into the problem of multiprocessor snooping of cache data lines in processors with blocking caches included stalling the entire cache arrangement while the snoop is checked. In these prior investigations, if there is a pending access for the line the snoop is trying to access, the snoop is held off and not allowed to complete. Such arrangements in these prior investigations tended to cause decreased performance because while the cache arrangement is stalled, another snoop is not allowed to be sent onto the bus until the first one is completed.

In contrast to these prior investigations, the present invention advantageously distributes snooping across buffer queues in the cache arrangement, and allows pending transactions to be marked as having been snooped by setting the snoop hit bit. In response to setting the snoop hit bit, the snoop is completed by relinquishing any ownership of the data line referenced by the buffer. When the data for the pending transaction is returned, the line containing the data is relinquished as soon as the transaction that caused the bus reference is satisfied.

In accordance with the present invention, when a snoop is received, every buffer queue inside the cache that contains memory data that has not already been snooped, is snooped. Exceptions are as follows: accesses that have not been issued on the system bus are not required to compare their addresses to the incoming snoop address, and data being sent out onto the bus in response to previous snoops does not need to compare its addresses to the snoop address. In the preferred embodiment, all other cache addresses are compared to the snoop address. Of course, in addition to the buffer queues, any cache tags of the first and second level data caches 107, 109 of the cache arrangement are also searched to determine if the data line being snooped is present.

In the preferred embodiment, the cache arrangement supports line status of a full MESI protocol, which supports Modified, Exclusive, Shared, and Invalid status. If the status of cache data line is exclusively owned (Exclusive), the owning cache arrangement holds the only cached copy of the cache data line, which is updated locally without informing the other cache arrangements. If the status of the cache data line is "Shared" status, other cache arrangements may have copies of the cache data line, and must be informed about updates to the cache data line. The "Invalid" line status indicates that the cache entry does not contain useful data. The "Modified" status indicates that data has been written to the cache entry, and therefore it is modified or "dirty".

A given one of the CPUs can advantageously assume ownership of a cache data line as soon as it has issued a transaction on the bus, or, alternatively, it can be required to wait for the data to return for it to assume ownership of the line. For the sake of the subsequent discussions herein, it should be understood that in the preferred embodiment the processor assumes the ownership of the cache data line as soon as it issues the memory request on the system bus.

With respect to snoops, in the preferred embodiment the system bus is monitored for memory accesses (reads or writes) from the other processors. The cache tags are searched, and if a tag matches the snoop address, then the line is present in the static random access memory (SRAM) of the cache. If the status of the line in the cache is not in the modified status, it will be invalidated (or the cache can perform a cache to cache transfer to provide the cache data line to the requesting processor) and the snoop can be completed and acknowledged as completed.

In one preferred embodiment, snoop completion is held off until the line being flushed is actually issued on the bus. However a better performing solution of another preferred embodiment is to complete the snoop as soon as possible with the notification that the line will be updated in memory with the correct data. The requesting processor then must wait until it sees the write back to memory of the data, or alternatively a cache to cache transfer can be supported for the data.

The invention provides beneficial results, independent of whether the processor performs cache to cache transfers on modified, exclusive, or shared lines. However, if the cache data line is in the modified status, it is preferably flushed out to memory before the snoop is complete or is transferred to another cache via a cache to cache transfer. In this case, a snoop response is made to indicate that the line is present, and will be flushed out.

It should be understood that the invention particularly applies to the buffer queues in the cache arrangement. In addition to the cache tags of the first and second level data caches, these buffer queues are also snooped when a snoop request is received. Snooping the buffer queues is particularly important because a data line may have been moved out of the data caches, and there may no longer be any indication in the cache tags that the data line is owned by this processor.

Furthermore, one of the processors may have issued a request on the bus, but not have received the response. Because the processor got on the bus with the request, it now owns the data line, but has no data for it. However, when a snoop is received, in order to operate correctly, all data lines owned by this processor must be snooped.

The method and apparatus of the invention includes at least one bit (referred to herein as the snoop hit bit) assigned to each entry of these internal buffer queues to record whether a snoop compare has been successful for this buffer queue entry. While the inventors are unaware of any previous teachings by others directed to a cache arrangement including buffer queues having snoop hit bits for recording snoop hits, just a snoop hit of a data cache is well understood by one having ordinary skill in the art, as discussed for example in U.S. Pat. No. 5,369,753 entitled Method and Apparatus for Achieving Multilevel Inclusion in Multilevel Cache Hierarchies, and issued Nov. 29, 1994 to Roger E. Tipley.

As shown in FIG. 1 of the present invention, included in the cache arrangement 101 are buffer queues 123 containing outstanding requests that have been issued to the bus, such as a memory return buffer queue and a Level 2 (data cache) Write Buffer Queue. For example, when a line is flushed from the cache via a Virtual Address Flush Cache instruction (VAFC), or when a line is otherwise flushed from the cache hierarchy, that line is placed into the Level 2 Write Buffer Queue. Since the cache line is being moved out of the cache, there may no longer be any indication in the cache tags that the cache line is owned by the processor. However, since this processor still owns the cache line in the Level 2 Write Buffer Queue, there is a need for the addresses associated with the Level 2 Write Buffer Queue to be snooped.

For the memory return buffer queue (MRQ) it should be understood that the lines requested as Exclusive from memory (for instance, the lines to be written into by the processor) are considered to be owned by the processor once their address is in the MRQ, even if the data is not available yet. As a result, the MRQ is searched using each snoop address, even if the data is not available yet. As a result, the MRQ is searched using each snoop address and, if an entry's address matches the snoop address, that entry is tagged as snooped and captures a transaction identification for the data to be provided in a corresponding memory flush buffer (not shown in FIG. 1).

Also included in the preferred embodiment of the cache arrangement shown in FIG. 1 are cache internal buffer queues 125 such as a Store Buffer Queue, and a level 2 Outstanding Access Request Buffer Queue. The level 2 cache Outstanding Access Request Buffer Queue keeps track of accesses issued to the level 2 data cache that are not resolved yet. The Store Buffer Queue (STQ) holds the address, byte enable write control bits, data and other relevant information for stores.

Furthermore, the method and apparatus of the invention includes using one or more comparators (not shown in the block diagram of FIG. 1) for comparing the snoop address to an address in each of the buffer queues to provide a respective comparison result, and setting the snoop hit bit assigned to the buffer queue of the cache based upon the result of the comparison successfully matching the snoop address with the address stored in the buffer queue of the cache. It should be understood that in the preferred embodiment, if the snoop hit bit of an entry of the buffer queue is currently set, then the snoop hit bit is not set again and a new transaction identification is not captured by another match of the snoop address with the address stored in the buffer queue for that entry.

Subsequent steps resolve what to do with each of the buffer queue entries that have their respective snoop hit bit set, before clearing the snoop hit bit. For buffer queue entries having data and having their respective snoop hit bits set, the MESI status of the buffer queue entries are examined and appropriate action is taken. Specifically, if the MESI status of the buffer queue entry is in the Modified status, then the buffer queue entry is flushed out to the system bus. If the MESI status of the buffer queue entry is in the Exclusive or Shared status, then the buffer queue entry is invalidated.

In a special case where a buffer queue entry has the snoop hit bit set, but does not already have data stored in the buffer queue, control logic delays satisfaction of requests for stores or loads until data arrives. As data arrives in the buffer queue entry, the request for stores or loads is satisfied. Then the status of the buffer queue entry is examined and the appropriate action is taken depending upon the respective MESI status of the buffer queue entry, just as for the previously discussed buffer queue entries having data already fully present therein when the snoop compare succeeded in the snoop hit. If after receiving the data, the buffer queue entry is now in the Modified status, the buffer queue entry is flushed out to the system bus. If after receiving the data, the buffer queue entry is now in the Exclusive or Shared status, then the data line entry in the buffer queue is invalidated.

Sequencing of snoop requests for a single cache data line are handled by the requesting processor noting which other processor has the cache data line modified and will be sending the data of the cache data line back to memory. Each processor request is chained along, and as soon as the reques issues its request on the bus, the requesting processor is given ownership of the cache data line being requested. No single long queue is needed to keep track of multiple requestors, because each requesting processor needs to keep track of just three things for each request in order to implement snooping correctly: a transaction identification (transaction ID) for the return transaction, a MESI status of the cache data line, and whether or not requesting processor must give up the cache data line due to a snoop.

The transaction ID is useful for denoting either which processor the data will come from, or the Input/Output (I/O) adapter where the data will come from in systems with coherent I/O. So long as the system guarantees that the requesting processor will receive its data once the requesting processor issues a request, the invention is beneficial in simplifying and making more efficient snoops, even in systems without a single bus to guarantee proper access sequencing from the visibility level of the requesting processor.

The present invention provides an efficient method and apparatus for snooping both cache memory and associated buffer queues in a novel cache subsystem arrangement. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefor, the invention may be practiced otherwise than as specifically described and illustrated.

What is claimed is:

1. A method comprising the steps of:

providing a cache memory for storing a data line, and a cache tag for identifying an address of the data line and a status of the data line;

providing at least one buffer queue coupled with the data cache for storing the address of the data line and the status of the data line, thereby referencing the data line;

comparing a snoop address to the address stored in the buffer queue so as to provide a positive comparison result if the snoop address matches the address stored in the buffer queue, thereby indicating a snoop hit condition;

assigning at least one snoop hit bit to the buffer queue; and setting the snoop hit bit in response to the positive comparison result indicating the snoop hit condition;

wherein a snoop request is satisfied even if there is still a pending transaction involving the buffer queue, once the comparison result is stored in the snoop hit bit of the buffer queue.

2. A method as in claim 1 further comprising a step of relinquishing any ownership of the data line referenced by the buffer queue in response to the setting of the snoop hit bit.

3. An apparatus comprising:

a first and second central processing unit;

a main memory;

a system bus coupled with the first and second central processing unit and the main memory;

a bus controller coupled with the system bus for initiating a snoop request and providing a snoop address in response to the first central processing unit accessing the main memory over the system bus;

a cache arrangement coupled with the second central processing unit, the cache arrangement including a cache memory for storing a data line, a cache tag for identifying an address of the cache data line and a status of the cache data line, and a buffer queue for storing the address of the cache data line and the status of the cache data line;

said cache arrangement responsive to the snoop request to compare the snoop address with the address stored in the buffer queue to provide a positive comparison result if the snoop address matches the address stored in the buffer queue, thereby indicating a snoop hit condition;

wherein the buffer queue further has a snoop hit bit for storing a record of the positive comparison result that indicated the snoop hit condition; and wherein a snoop request is satisfied even if there is still a pending transaction involving the buffer queue, once the comparison result is stored in the snoop hit bit of the buffer queue.

4. An apparatus as in claim 3 wherein the buffer queue includes a buffer queue for containing outstanding requests that have been issued to the bus.

5. An apparatus as in claim 4 wherein the buffer queue includes a memory return buffer queue.

6. An apparatus as in claim 4 wherein the buffer queue includes a cache write buffer queue.

7. An apparatus as in claim 3 wherein the buffer queue includes a store buffer queue.

8. An apparatus as in claim 3 wherein the buffer queue includes an outstanding access request buffer queue.

* * * * *